(12) United States Patent
Beckmann

(10) Patent No.: US 7,416,712 B2
(45) Date of Patent: Aug. 26, 2008

(54) METHOD FOR OBTAINING COBALT AND NICKEL FROM ORES AND ORE CONCENTRATES

(76) Inventor: Alexander Beckmann, Haselnussweg 2, Wesel (DE) 46487

( * ) Notice: Subject to any disclaimer, the term of this patent is extended or adjusted under 35 U.S.C. 154(b) by 25 days.

(21) Appl. No.: 10/489,253

(22) PCT Filed: Sep. 14, 2002

(86) PCT No.: PCT/DE02/03394

§ 371 (c)(1),
(2), (4) Date: Apr. 13, 2004

(87) PCT Pub. No.: WO03/025234

PCT Pub. Date: Mar. 27, 2003

(65) Prior Publication Data

US 2004/0187643 A1 Sep. 30, 2004

(30) Foreign Application Priority Data

Sep. 14, 2001 (DE) .................. 101 45 419
Jan. 12, 2002 (EP) .................. 02000758

(51) Int. Cl.
*C22B 3/04* (2006.01)
*C22B 30/04* (2006.01)
*C22B 23/00* (2006.01)

(52) U.S. Cl. .................. 423/150.1; 423/87; 75/743; 75/744

(58) Field of Classification Search ............. 75/10.13, 75/626, 628
See application file for complete search history.

(56) References Cited

U.S. PATENT DOCUMENTS

| | | | | |
|---|---|---|---|---|
| 3,053,651 A | * | 9/1962 | McGauley | .................. 423/37 |
| 3,313,601 A | * | 4/1967 | Marvin | .................. 423/3 |
| 3,451,804 A | | 6/1969 | Malmstrom et al. | |
| 3,772,423 A | * | 11/1973 | Stevens et al. | .................. 423/144 |
| 3,975,507 A | * | 8/1976 | Matson | .................. 423/561.1 |
| 4,110,106 A | | 8/1978 | Frankiewicz | |
| 4,110,400 A | * | 8/1978 | Jha et al. | .................. 423/141 |
| 4,311,520 A | * | 1/1982 | Kruesi et al. | .................. 75/10.13 |
| 4,328,192 A | | 5/1982 | Tolley et al. | |
| 4,585,477 A | | 4/1986 | Mioen | |
| 4,888,207 A | | 12/1989 | Flynn, Jr. et al. | |
| 5,626,648 A | | 5/1997 | Duyvesteyn et al. | |
| 5,763,259 A | * | 6/1998 | Panos | .................. 435/262 |
| 6,039,790 A | * | 3/2000 | Hultholm et al. | .................. 75/739 |
| 6,592,644 B2 | * | 7/2003 | Beckmann | .................. 75/10.13 |

FOREIGN PATENT DOCUMENTS

| | | |
|---|---|---|
| AU | 002201989 | 1/1997 |
| DE | 43 29 417 C1 | 8/1994 |
| EP | 0 041 841 | 6/1981 |
| WO | WO 01/44524 * | 6/2001 |

OTHER PUBLICATIONS

Webster's Seventh New Collegiate Dictionary, G. & C. Merriam Company, 1965, p. 170.*

* cited by examiner

*Primary Examiner*—Roy King
*Assistant Examiner*—Tima M McGurthy-Banks
(74) *Attorney, Agent, or Firm*—Jacobson Holman PLLC

(57) ABSTRACT

The invention relates to a method for obtaining metals from a cobalt and/or nickel arsenic sulfide ore or ore concentrate and/or a cobalt and/or nickel sulfide ore or ore concentrate, according to which the cobalt and/or nickel arsenic sulfide ore or ore concentrate and/or the cobalt and/or nickel sulfide ore or ore concentrate is reacted with sulfur or sulfur arsenic compounds to a reaction product, and dissolving and removing soluble metals and rare-earth metals.

16 Claims, No Drawings

METHOD FOR OBTAINING COBALT AND NICKEL FROM ORES AND ORE CONCENTRATES

This is a nationalization of PCT/DE02/03394 filed Sep. 14, 2002 and published in German.

The invention relates to a process for the extraction of cobalt and nickel from arsenosulfidic or sulfidic ores or ore concentrates.

By far the biggest part of the world's nickel and cobalt production is extracted from arsenosulfidic or sulfidic minerals. Cobalt and nickel frequently appear together or accompanied by other metal ores.

Among the cobalt-containing arsenosulfides, there may be mentioned, above all, safflorite ($CoAs_2$), skutterudite ($CoAs_3$), arsenopyrite ((Fe,Co,Ni)AsS) and cobaltine (CoAsS). Among the sulfides, there may be mentioned, above all, linnaeite ($Co_3S_4$).

Among the arsenosulfides, there may be mentioned, above all, rammelsbergite ($NiAs_2$), arsenopyrite (FeAsS), Gersdorffite (NiAsS) and nickeline (NiAs). Among the sulfides, there may be mentioned, above all, pentlandite (($Fe,Ni)_9S_8$), millerite (NiS) and bravoite (($Ni,Fe)S_2$).

Among the cobalt minerals, cobaltine is the most widespread mineral, and among the nickel minerals, it is pentlandite; therefore, these are of the greatest scientific and economic importance in the development of new extraction methods.

In addition, both minerals are characterized by regularly containing deposited or dissolved gold, platinum metals and other rare metals as well as rare earth metals.

The arsenosulfidic and/or sulfidic cobalt minerals are extracted from ores, which are usually milled and concentrated by a flotation process to yield an ore concentrate, whereby a substantial part of the silicates contained in the ground stock, in particular, is separated off.

The processing of the ores or ore concentrates is conventionally effected by calcining the ores, whereby the sulfide is oxidized into $SO_2$ at high temperatures, and metal oxides remain. The ores thus obtained can then be reduced by adding carbon, and the individual metals are optionally further purified by special methods.

Today, in addition to the known pyrometallurgical and hydrometallurgical processes, there are various approaches to leaching cobalt, nickel and other metals from the arsenosulfidic and/or sulfidic cobalt minerals.

The term "leaching" comprises both chemical leaching by $Fe^{III}$ and biological leaching (bioleaching) by microorganisms which are able to utilize sulfur as an energy source. Especially when iron-containing copper and nickel ores are used, only incomplete leaching has been possible to date.

It is the object of the invention to provide an improved process for extracting cobalt and nickel and other metals from arsenosulfidic and/or sulfidic ores or ore concentrates.

This object is achieved by a process in which
the arsenosulfidic and/or sulfidic cobalt and/or nickel ore or ore concentrate is converted to a reaction product by sulfur or sulfur-containing arsenic compounds; and
soluble metals and rare earth metals are leached from the reaction product.

This conversion is represented by the following equations:

It has been found that cobaltine can be converted to CoS and realgar almost completely when the process is conducted appropriately. In contrast, when the process is conducted in this way, pentlandite can be converted almost completely to NiS and pyrite. In this conversion, a cobaltine grain from the ground stock yields a grain predominantly having a core of realgar and a shell of CoS. In contrast to cobaltine, from cobalt sulfide, cobalt and the remaining metals enriched therein can be leached out with no problems using conventional oxidation methods. In the case of nickel, a pentlandite grain from the ground stock also yields a grain having a core of pyrite and a shell of NiS. It can be leached out with no problems using conventional leaching methods. It is particularly appropriate for the sulfur to be in a liquid state of aggregation. Depending on temperature, the sulfur is low-viscous and yellow to high-viscous and dark red/brown. In the liquid phase, conversions between λ-, π- and μ-sulfur occur. The different forms cause a depression of the solidification point. Therefore, sulfur is generally liquid within a range of from 111 to 444° C., the boiling point being dependent on pressure. Therefore, this temperature range is preferably employed, the range around 187° C. being less advantageous because the sulfur has a particularly high viscosity there, which again decreases at higher temperatures. Preferred are, on the one hand, temperature ranges of from 111 to 159° C., and alternatively from 350 to 444° C. Low temperatures are of course more favorable in terms of the necessary energy supply, while higher temperatures accelerate the reaction.

These reactions are exothermic so that a comparatively low expenditure of energy is necessary for the conversion.

A possible process for extracting cobalt or nickel from CoS or NiS, respectively, is described by the following equations:

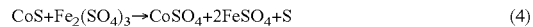

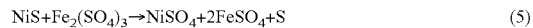

The cobalt or nickel sulfate produced, like the iron sulfate, is soluble in acid. Thus, cobalt, nickel and iron are solubilized successively and can be separated from one another and from the solution when the process is conducted appropriately.

What remains is a mixture of precious and other metals and rare earth metals contained in the ground stock, especially of gold, silver, platinum, platinum metals and zinc, which will deposit as a residue on the bottom of the tank in which the leaching process is performed.

With novel bioleaching processes, the cobalt and nickel can be leached out in a particularly environment-friendly manner and with a relatively low production of sulfuric acid. In this process, the cobalt sulfide is oxidized in accordance with

or

in the presence of special bacteria and separated in an aqueous solution and electrolyzed.

The conversion of the ores or ore concentrates should preferably proceed in an inert atmosphere, for example, under nitrogen or argon.

A range of between 50° C. and 550° C. has been established as a preferred temperature range for the conversion. Especially between 350° C. and 450° C., the conversion can proceed at a relatively high rate. The duration of the conversion depends on the size of the ground grains and the temperature and can be optimized by the skilled person by simple experimentation.

The conversion process of the ores or ore concentrates can be promoted by microwave irradiation. Since the microwaves heat up the individual grains of the ground stock in both inner and outer portions thereof, the diffusion processes proceeding in the conversion can be accelerated thereby. By this improvement of reaction kinetics, the process can be accelerated.

Depending on the reaction temperature and, if employed, the degree of the microwave irradiation, the conversion can proceed for a period of from 0.5 h to 10 h, especially from 2 h to 5 h.

The sulfur should be added to the cobaltine in stoichiometric amounts. This means that an analysis should be usually performed prior to the conversion in order to establish what amounts of sulfur are required for achieving a conversion according to equation (1), (2), (3) or comparable conversions, depending on the ore employed. An excess of sulfur should be avoided since it mostly yields a tacky mass when cooling down. Thus, in this case, "stoichiometric amounts" means that virtually no free sulfur should remain after completion of the reaction, based on the metal content of the ores or ore concentrates.

The sulfur can be added to the ground stock in a solid form, in which case the conversion of the ore or ore concentrate should be effected under ambient pressure, but may also be performed under a pressure above atmospheric of up to 10 bar. To avoid that too much sulfur evaporates at the temperatures for conversion, it may be advantageous for the conversion to proceed in an atmosphere saturated with sulfur vapor.

On the other hand, the conversion may also be effected without the addition of solid sulfur in an atmosphere containing gaseous sulfur under reduced pressure.

Conversion with the addition of a sulfur plasma is also possible.

It is also possible to react liquid sulfur with appropriately preheated ore or ore concentrate, since this highly accelerates the reaction and reduces the formation of by-products.

The process can be realized, for example, in a three-chamber tunnel furnace. The three-chamber tunnel furnace has first and third chambers which serve as sluices for the second chamber. The second chamber of the furnace is provided with electric heating coils and has an inlet for nitrogen or argon, which is used as a flushing gas. In addition, the second chamber may be provided with fused silica windows for introducing microwaves.

Experiments have shown that the conversion is optimized, in particular, when the mixture of ground stock and sulfur is irradiated with microwaves having a specific energy density of from 8 to 35 kWh/t, based on the quantity of the ground stock. Both microwaves of 815 MHz and those of 2.45 GHz can be used.

The conversion may also be effected in a fluidized bed reactor.

Surprisingly, the process according to the invention yields free-flowing products, i.e., the sulfur added does not cause agglutination of the reaction products, but is required for the conversion. Any agglutinations occurring can be easily broken up. Due to the pores formed, which are also due to the exothermic reaction, the product exhibits an at least 50 fold increase of surface area, based on the starting material. This permits a significantly improved attack by biological and/or chemical leaching agents.

The invention claimed is:

1. A process for extracting metals from an ore or ore concentrate comprising the steps of
    providing at least one ore or concentrate, thereof, comprising at least one mineral selected from the group consisting of $CoAs_2$, $CoAs_3$, $(Fe, Co, Ni)AsS$, $CoAsS$, $Co_3S_4$, $NiAs_2$, $FeAsS$, $NiAsS$, $NiAs$, $(Fe,Ni)_9S_8$, and $(NiFe)S_2$,
    adding a sulfur or a sulfur-containing arsenic compound,
    converting to a reaction product containing CoS and/or NiS, and
    leaching CoS and/or NiS from the reaction product containing CoS and/or NiS.

2. The process according to claim 1 further comprising the step of leaching arsenic from the reaction product.

3. The process according to claim 1 further comprising the steps of
    depositing rare earth metals on the reaction product containing CoS and/or NiS and
    separating off the rare earth metals, following the leaching step.

4. The process according to claim 3 further comprising the steps of
    depositing additional metals on the reaction product containing CoS and/or NiS, wherein the additional metals are selected from the group consisting of gold, silver, platinum, platinum metals, and zinc, p1 separating off the additional metals, following the leaching step.

5. The process according to claim 1, wherein the leaching step is performed using a bioleaching process.

6. The process according to claim 1 characterized in that the converting step is performed in an inert atmosphere.

7. The process according to claim 1, characterized in that the converting step is performed at a temperature of between 50° C. and 550° C.

8. The process according to claim 1, characterized in that the converting step is performed at a temperature of between 350° C. and 450° C.

9. The process according to claim 1, characterized in that the converting step is promoted by microwave irradiation.

10. The process according to claim 1, characterized in that the converting step is effected for a period of from 0.5 h to 10 h.

11. The process according to claim 1, characterized in that the converting step is effected for a period of from 2 h to 5 h.

12. The process according to claim 1, characterized in that sulfur is added in a solid state and the converting step is effected under a pressure of from 1 to 10 bar.

13. The process according to claim 1, characterized in that the converting step is performed in an atmosphere saturated with sulfur vapor.

14. The process according to claim 1, characterized in that sulfur is added.

15. The process according to claim 14. characterized in that sulfur is added in a gaseous state and the converting step is effected under reduced pressure.

16. The process according claim 14, characterized in that sulfur is added as a sulfur plasma.

* * * * *